No. 792,974. PATENTED JUNE 20, 1905.
E. R. DOUGLAS.
COUNTERSHAFT ATTACHMENT FOR ELECTRIC MOTORS.
APPLICATION FILED OCT. 17, 1904.

Witnesses:
Samuel W. Balch
Richard S. Harvey

Inventor,
Edwin Rust Douglas
by Thomas Ewing, Jr.
Attorney

No. 792,974.

Patented June 20, 1905.

UNITED STATES PATENT OFFICE.

EDWIN RUST DOUGLAS, OF EAST ORANGE, NEW JERSEY, ASSIGNOR TO CROCKER-WHEELER COMPANY, OF AMPERE, NEW JERSEY, A CORPORATION OF NEW JERSEY.

COUNTER-SHAFT ATTACHMENT FOR ELECTRIC MOTORS.

SPECIFICATION forming part of Letters Patent No. 792,974, dated June 20, 1905.

Application filed October 17, 1904. Serial No. 228,897.

*To all whom it may concern:*

Be it known that I, EDWIN RUST DOUGLAS, a citizen of the United States of America, and a resident of East Orange, county of Essex, and State of New Jersey, have invented certain new and useful Improvements in Counter-Shaft Attachments for Electric Motors, of which the following is a specification.

This invention relates to a counter-shaft attachment for electric motors the support of which is in the form of a subbase on which the motor is supported.

On account of the varied applications of small electric motors the manufacturer of such motors is called upon to supply each size in various types. A common difference is in the presence or absence of a counter-shaft to be furnished with the motor. This has necessitated special frames for such motors as are to have counter-shafts, and in order to be prepared to promptly supply both types the manufacturer heretofore has had to manufacture and carry in stock entire motors constructed both with and without counter-shafts.

This invention renders the separate manufacture of both types of motors unnecessary, as the object of the invention is to provide a counter-shaft of simple and durable construction and adapted to standard motors without extra parts or provision being made therefor in the construction of the motors other than is requisite in the proper manufacture of the essential parts of a motor.

Figure 1:
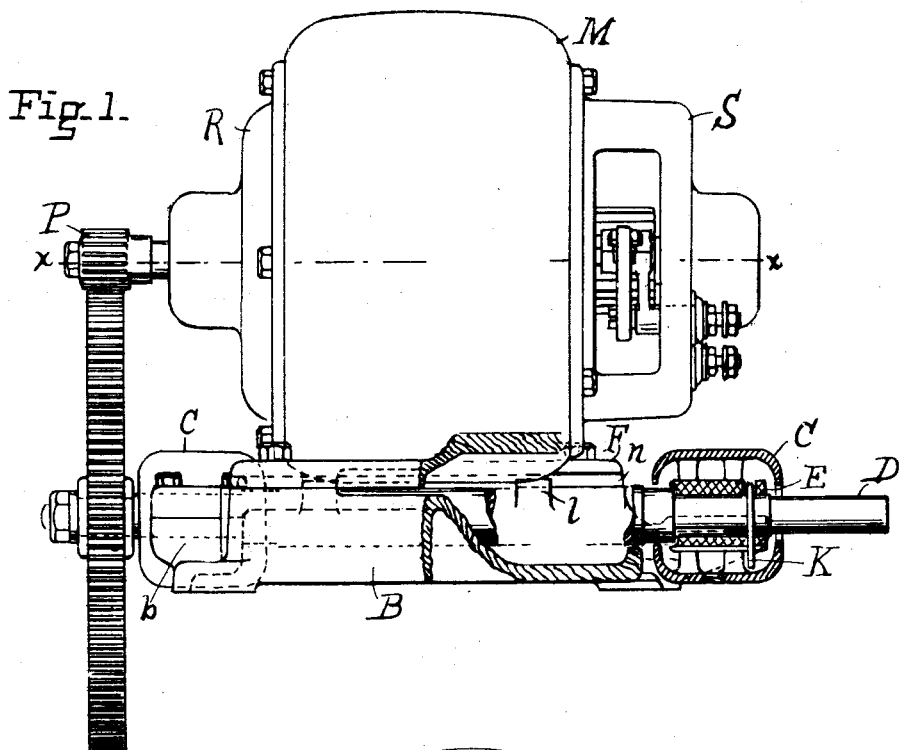
Figure 2:
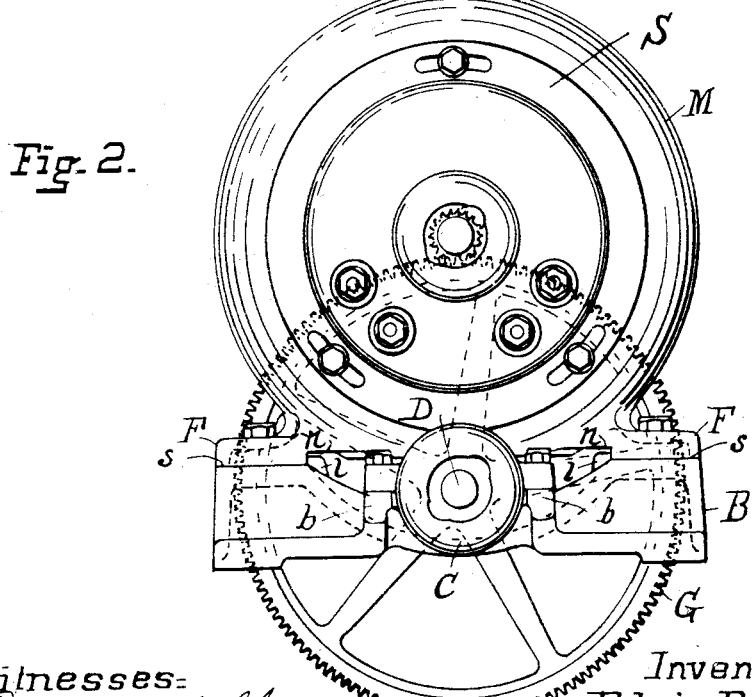

In the accompanying sheet of drawings, which forms a part of this application, Figure 1 shows a standard motor supported on a subbase which is the support of the counter-shaft constituting my invention, one of the feet of the motor being broken away and the support for the counter-shaft being broken away at the right to the median line. Fig. 2 is a front view of the motor and counter-shaft attachment.

The motor is of standard construction, exactly as it would be manufactured for service where no counter-shaft is required, except that a pinion P is substituted for the usual pulley. The magnet-frame M of the motor is provided with feet F, and in the operation of manufacture the bottom of the feet of the frame are first finished, and alining parts consisting of notches $n$ are milled at the same time by a gang milling-cutter parallel to the axis $x\ x$ of the motor. These machined spots afford means for the support and accurate setting and alining of the frame in a suitable boring and facing jig having corresponding machined spots while boring out the poles and while facing the frame for end shields R and S, which carry the armature-bearings. All magnet-frames being bored and faced on the same jig, accuracy of alinement and interchangeability are secured. These spots also serve as the contacting points with the subbase B when the motor is to be provided with a counter-shaft and insure accurate alinement and interchangeability. The subbase is provided for this purpose with planed spots $s$, opposite the feet of the motor, and alining parts which engage the alining parts of the motor, consisting of projecting lugs $l$, accurately finished to match with the notches which are milled on the feet of the motor. Brackets $b$ project from the front and rear of the subbase and have corners finished in alinement with finished spots and lugs on the subbase for the reception of the motor. This alinement may be secured by milling these corners at the same time as the spots and lugs with a gang-cutter or by suitable jigs and fixtures or otherwise. Bearings C for a counter-shaft D are bolted to and are supported from the brackets. The bearings have oil-chambers and contain bushes E and an oiling-ring K. A gear G on the end of the counter-shaft engages with the pinion on the armature-shaft of the motor and makes power connection between the two shafts.

It is not essential that bearings for the counter-shaft be made separate from the subbase. These bearings might be formed in the subbase itself and integral with it and alinement and interchangeability secured by suitable jigs and other tools used in making them.

Motors provided with this counter-shaft attachment are used principally for individual machine-tool driving and are usually placed on a bracket attached to the machine-tool, which is provided by the manufacturer of the tool. This is usually an elevated support, which the gear can overhang.

What I claim as new, and desire to secure by Letters Patent of the United States, is—

1. A counter-shaft attachment for electric motors, the feet of which motors are provided with notches definitely positioned with respect to the axis of the motor, the attachment comprising a counter-shaft with power connection to the armature-shaft, and a subbase with bearings for the counter-shaft and with lugs definitely positioned with respect to the counter-shaft and projecting from the subbase to engage the notches of the feet of the motor, and means for attaching the motor and subbase together, substantially as described.

2. A counter-shaft attachment for electric motors, the feet of which motors are provided with accurately-finished notches parallel to the axis of the shaft of the motor, the counter-shaft attachment comprising a counter-shaft with power connection to the armature-shaft and a subbase with bearings for the counter-shaft and accurately-finished lugs arranged parallel to the axis of the counter-shaft to engage with the notches on the feet of the motor, with means for attaching the motor and subbase together, substantially as described.

Signed by me at New York city, borough of Manhattan, this 15th day of October, 1904.

EDWIN RUST DOUGLAS.

Witnesses:
    SAMUEL W. BALCH,
    WILLIAM H. POWELL.